April 13, 1965 P. E. ROSENFELD 3,178,586

SELF-CORRECTING SHIFT-REGISTER DISTRIBUTOR

Filed March 23, 1961 2 Sheets-Sheet 1

INVENTOR
P. E. ROSENFELD
BY Harry C. Hart
ATTORNEY

SELF-CORRECTING SHIFT-REGISTER DISTRIBUTOR

Filed March 23, 1961 2 Sheets-Sheet 2

INVENTOR
P. E. ROSENFELD
BY Harry C. Hart
ATTORNEY

United States Patent Office 3,178,586

Patented Apr. 13, 1965

3,178,586

SELF-CORRECTING SHIFT-REGISTER DISTRIBUTOR

Peter E. Rosenfeld, Plainfield, N.J., assignor to Bell Telephone Laboratories, Incorporated, New York, N.Y., a corporation of New York Filed Mar. 23, 1961, Ser. No. 97,779
9 Claims. (Cl. 307—88.5)

Figure 1:
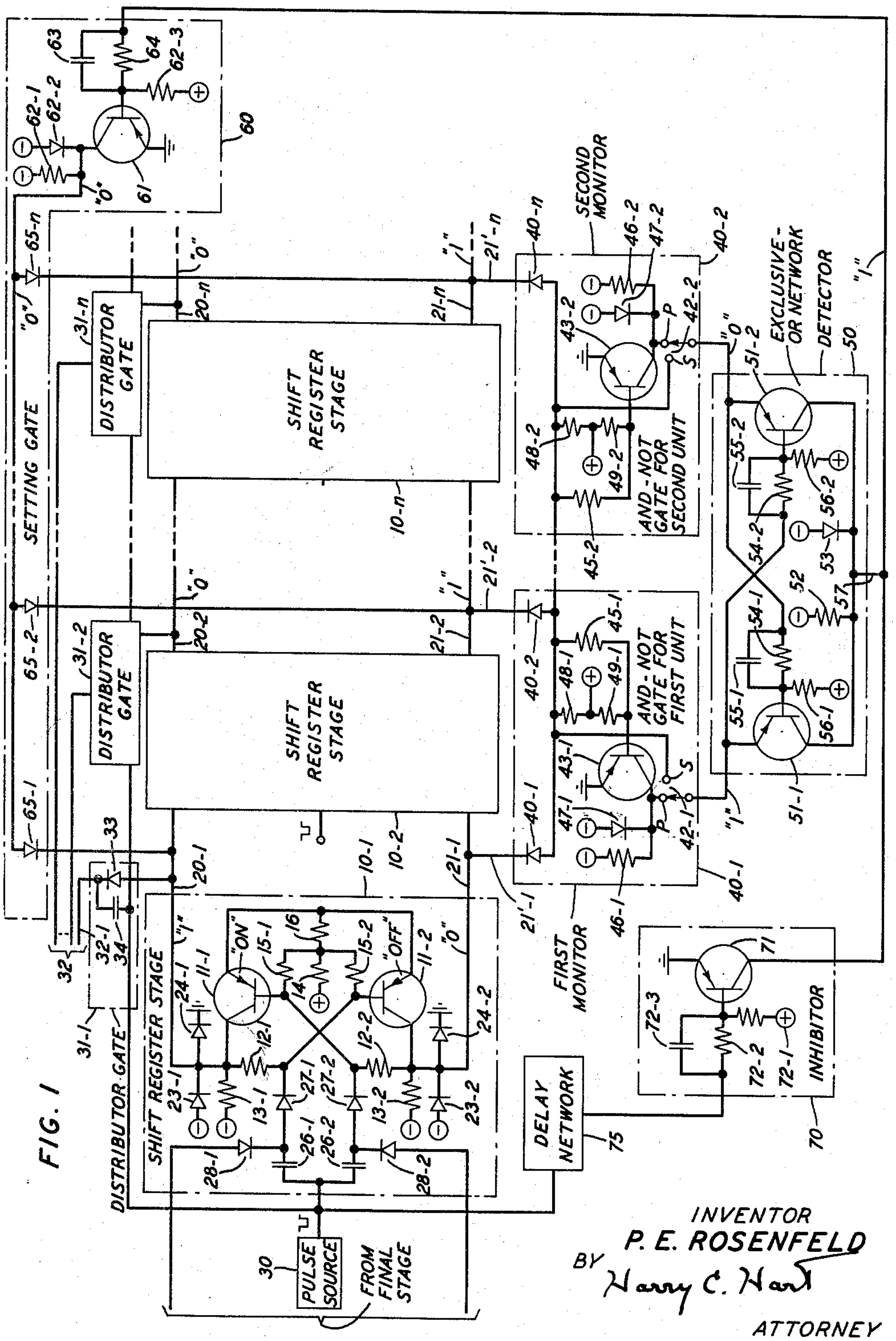

This invention relates to the distribution of control signals and more particularly to the detection and correction of error conditions accompanying the distribution.

In the performance of control operations, various permutations of control signals are required at distinctive distribution points from time to time. Master timing, for example, entails the sequential appearance of a control signal at successive distribution points.

Typically, the distribution points are associated with respective stages of a shift-register. The resultant distributor relies upon the multistate character of the register stages and upon its ability to transfer settings from preceding to succeeding stages for each occurrence of a shifting signal. Initially, the register stages of the distributor are set with a prescribed permutation of signal states, which, for bistate stages, form a code pattern constituted of "ones" and zeroes." In master timing one position of the pattern is occupied by a "one" and the remaining positions are occupied by "zeros."

Although a properly functioning distributor continually permutes the code pattern of its register stages only in response to the occurrence of a shifting signal, noise and malfunctions may cause the appearance of spurious signal conditions. An undesired "one" may appear at a stage other than that indicated by the control sequence, or, alternatively a desired "one" may disappear entirely.

Consequently, it is an object of the invention to detect the occurrence of spurious signal conditions in the distributor. A concurrent object is to detect the spurious conditions at their moments of occurrence. It is a further object of the invention to sense either the presence of an undesired "one" or the absence of a desired "one." A collateral object is to sense both the absence and the presence of the "one" in the same detector. A still further object of the invention is to use the detection of a spurious condition to generate an error signal that re-establishes the prescribed code permutation among the various stages of the distributor.

The invention accomplishes the above and related objects by selectively monitoring the register stages of a distributor and comparing the monitor outputs to detect each non-prescribed permutation of signal states. Following detection, the stages are reset to re-establish a pre-existing sequence of distributed control signals. In particular, the stages are grouped into at least two units whose respective outputs are collated to provide control signals for a detector. Like inputs to the detector then generate an error signal that resets the stages with a prescribed permutation of signal states.

It is a feature of the invention that immediate detection of an error condition can be achieved with a plurality of detectors when the distributor has at least three stages. The number of detectors is one-half of the number of stages, with any fractional remainder rounded to unity. Upon detection of an error condition, the distributor is reset or, alternatively, it is deactivated until the occurrence of a framing signal that assures distribution synchronism.

Figure 2:
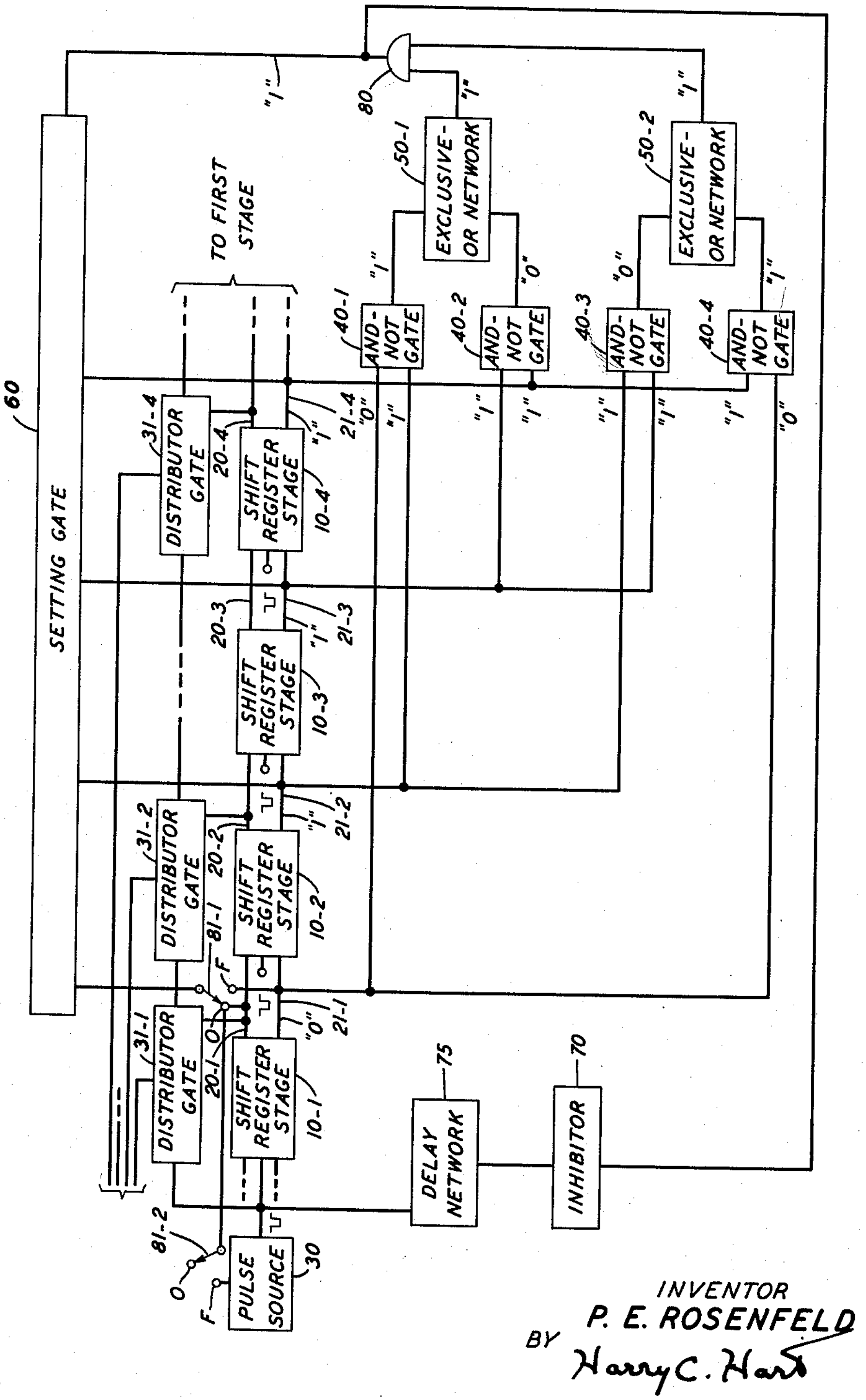

Other features of the invention will become apparent after the consideration of several illustrative embodiments, taken in conjunction with the drawings in which:

FIG. 1 is a schematic and block diagram of a self-correcting shift-register distributor; and FIG. 2 is a block diagram of the distributor of FIG. 1, as adapted for instantaneous detection of an error condition.

Turn now to FIG. 1, showing a distributor constituted of a shift register with like bistable stages 10–1 through **10–*n* in tandem connection. For convenience, the register is of the closed-loop variety with its final stage 10–*n* coupled to its first stage 10–1**.

Because the bistability of each stage 10 is attained with a pair of active elements 11, complementary signal levels are available at respective first and second output terminals 20 and 21. For each occurrence of a shifting signal supplied by a pulse source 30, the signal levels of a preceding stage are transferred to a succeeding stage. The shifting signal is also applied to individual distributor gates 31 where it acts in concert with signal levels at like first terminals 20 of the stages 10 to produce timing signals on the individual leads of a distributor cable 32.

To detect a timing error, the register is subdivided into two units. From each unit, like second terminals 21 of the constituent stages 10 are connected in respective groups to first and second monitors 40–1 and 40–2. These monitors, in turn, energize a detector 50 in order to activate a setting gate 60 for the entire distributor. Premature operation of the detector during shifting is prevented by the interconnection of the detector 50 and the pulse source 30 through an inhibitor 70.

In each stage 10, of which only the first stage 10–1 is depicted in detail, respective cross-coupling resistors 12–1 and 12–2 interconnect the collector *c* of one transistor 11–1 with the base *b* of the other transistor 11–2. Distinctive negative polarity voltages are applied to the collectors *c* through separate load resistors 13–1 and 13–2. Further biasing with a positive polarity voltage takes place through a biasing resistor 14 at the junction of series connected coupling resistors 15–1 and 15–2 joining the two bases. Completion of the base to emitter paths *b–e* is by way of a resistor 16 that is common to both transistors 11.

Aside from external circuit influences, inevitable voltage and component imbalances within each stage cause one of the transistors, for example, transistor 11–1, to reach conduction, i.e., be "on" before the other. Thereafter, because of the cross-coupling, the "on" transistor holds the other transistor 11–2 in the "off" condition. The signal levels thus established at the various collectors *c* are known as states. To regulate the signal levels, despite circuit loading, a pair of clamping diodes 23 and 24 is connected to each collector *c*. The first such diodes 23 have their anodes *a* fixed at a negative potential taken as minus four volts for convenience. The cathodes of the other clamping diodes 24 are grounded. Consequently, whenever the transistor 11–1 is in the "off" condition, its output signal level is at minus four volts and the output at the complementary transistor 11–2 is at ground level. Being discrete, these levels may be identified with a binary code.

For convenience, the "off" condition, which exists when the clamping diode holds the collector of a transistor at minus four volts, is designated a binary "0" ("zero"). The converse condition, when the collector is at ground potential, is designated a binary "1" ("one").

During normal operation of the distributor the various signal states are successively transferred from each preceding stage to each succeeding stage. This requires at each stage 10 both the presence of a shifting signal and the signal levels of the preceding stage. The shifting signal is applied to the base *b* of each transistor 11 through separate first and second paths that include a blocking capacitor 26 and a steering diode 27. The connection of the first and second terminals 20 and 21 of the preceding stage is by way of auxiliary diodes 28–1 and 28–2, whose cathodes *k* are connected to the respective junctions of the capacitors 26 and the steering diodes 27.

With respect to the first terminals 20 of the stages 10, assume the storage of a "1" in the first stage 10–1 and a "0" in the remaining stages 10–2 through 10–*n*. When a shifting signal is applied to the first stage 10–1, the cathode voltages of the auxiliary diodes 28 are driven below ground level. Since the voltage level at the first terminal 20–*n* of the final stage 10–*n* is minus four volts, little conduction takes place through the first auxiliary diode 28–1 but, since the voltage on the second terminal 21–*n* is at ground level, appreciable conduction takes through the second auxiliary diode 28–2 and charges the associated storage capacitor 26–2.

On termination of the shifting pulse signal, the ensuing discharge of the capacitor 26–2 provides a positive-going signal at the base *b* of the first transistor 12–1, previously conducting, and turns it off. This completes the transfer to the first stage 10–1 of the "0" that formerly appeared at the first terminal 20–*n* of the final stage 10–*n*.

Thus, with respect to like terminals 20 of the stages 10, it is seen that the distributor stores a sequence of code signals, which are transferred on a stage by stage basis for each occurrence of the shifting pulse signal. It is apparent that a complementary sequence of code signals is available at the other terminals 21 of the stages 10. For master timing, one posiiton in the pattern of the code signals is occupied by a "1" and the remaining positions are occupied by "0's."

As the "1" propagates among the stages 10, it is translated into a timing signal that appears sequentially at the distributor gates 31. With a "1" in the first stage 10–1, for example, the anode *a* of the diode 33 in the first distributor gate 31–1 is maintained at ground potential. Consequently, a negative-going shifting signal from the pulse source 30 causes the distributor capacitor 34 to charge. On termination of the shifting signal, a positive-going timing signal appears at the first distributor lead 32–1.

To detect a non-prescribed sequence of timing signals at the distributors 31, the stages 10 are divided into at least two units that are coupled to respective monitors 40–1 and 40–2 which can be activated only by the presence of a distinctive signal at any one of their various inputs 21[1]. The monitor 40 employs gating diodes 41 that can be coupled directly to a detector 50 by setting their switches 42 in their secondary positions *s*. However, it is generally desirable for the monitors 40 to provide gain. In that case the switches 42 are set in their primary positions *p* and the monitors 40 advantageously include grounded emitter transistors 43. The bases *b* of the transistors 43 are interlinked through respective current limiting resistors 45 with the anodes *a* of gating diodes 40 connecting the monitors 40 to their respective units. At the collectors *c*, negative voltages supplied through resistors 46 and rectifying diodes 47 achieve biasing and clamping as in the stages 10 proper. Because the emitters *e* are grounded, additional clamping diodes are unnecessary. Positive bias voltages to maintain the monitor transistors 43 normally in the "off" condition are supplied at the junctions of voltage divider resistors 48 and 49 that shunt the current limiting resistors 45.

If the signals applied to a given monitor are all "ones" ("1's") as indicated for the second monitor 40–2, the cathodes *k* of the gating diodes 40 are all maintained at ground level. Consequently, the positive voltage at the junction point of the divider resistors 48–2 and 49–2 keeps the second monitor transistor 43–2 non-conducting and the clamping diode 47–2 maintains the collector voltage at a negative four volts, indicative of a "zero" ("0").

On the other hand, if at least one "zero" ("0") is appiled, as indicated for the first monitor 40–1, the monitor transistor 43–1 is driven into conduction and its collector *c* assumes the ground level potential of a binary "1." Thus, with the switches 42 in their primary positions *p* the monitors 40 are AND-NOT gates since each provides a "0" output when all of its inputs are "1's," while providing a "1" output for at least one "0" input. When the monitor switches 42 are set in their secondary positions *s*, the monitors 40 become AND-GATES since each provides a "1" output when all of its outputs are "1's," while providing a "0" output for at least one "1" input.

A comparison of the monitor outputs is made at the detector 50 which is maintained active for dissimilar inputs, but remains quiescent for similar inputs. The detector 50 desirably employs a pair of transistors 51 that are jointly clamped and biased with a resistor-diode arrangement 52–53 similar to that employed in conjunction with the monitors transistors 43. In order that each input may influence both transistors 51, respective cross-coupling resistors 54–1 and 54–2 interconnect the base *b* of one transistor with the emitter *e* of the other. The cross-coupling resistors 54 are bypassed with capacitors 55–1 and 55–2 to accomplish pulse sharpening. A positive bias, similar to that used in the monitors 40, is applied to each base *b* through an associated bias resistor 56.

As long as the emitter inputs are alike, the emitter-base voltages counterbalance each other and maintain both transistors 51 non-conducting, so that the collector output is at a negative four volts, indicative of a "0." Contrariwise, if the emitter inputs differ, one of the transistors 51 will be in its conduction condition and the collector output will be at ground potential indicative of a "1." Consequently, the detector 50 is seen to be an EXCLUSIVE-OR network in that only for a "0" at one input and a "1" at the other input does a "1" appear at the output 57.

The detector output is applied to a setting gate transistor 61 whose auxiliary components 62 are like those of the monitors, except for the addition of a pulse sharpening capacitor 63 in shunt with a current limiting base resistor 64. From the collector *c* of the transistor 61, the setting signal is distributed to the anodes *a* of setting diodes 65 that connect with like terminals 21 of all stages 10, except for the first stage 10–1 which has a complementary connection to terminal 20–1.

As long as the signal derived from the detector 50 is a "1," i.e., is at ground potential, the setting gate transistor 61 is maintained in its "off" condition, so that its collector voltage is held at a negative four volts through the action of its clamping diode 62–2. Since the minimum voltage at the terminals of the various stages is limited, by clamping, to a negative four volts, the setting gate 60 is inoperative unless a "0" is applied at its input. Then a "1" appears at the anode *a* of each setting diode 65 and sets each stage 10 accordingly.

In order to prevent premature operation of the setting gate 60, an inhibitor 70, accompanied by a delay network 75, maintains the detector output at ground potential during shifting. The inhibitor is constituted of a grounded emitter transistor 71 with a base circuit configuration 72 similar to that of the setting gate transistor 61.

Accordingly, resetting of the stages 10 can only take place in response to the existence of a spurious signal condition.

For example, if the monitors 40 are AND-NOT gates and if an undesired "1" appears in one of the stages at some instant during the distribution cycle, a "0" will ultimately appear at both monitors 40–1 and 40–2 and produce "1's" at both inputs of the detector. If the monitors are AND gates, an undesired "1" will ultimately produce "0's" at the detector inputs. In response to either of the like-signal conditions at its inputs, the detector 50 becomes quiescent and generates a "0" that activates the setting gate 60.

Likewise, if the desired "1" should disappear entirely from its appropriate stage, the outputs of both monitors 40 will be either "0's" or "1's" and once again the presence of like signals at the detector 50 will produce an output "0" that activates the setting gate 60.

Hence, each malfunction of the distributor, whether it be caused by the presence of an undesired "1," or the absence of a desired "1" will be corrected through the use of a single error detector 50.

While the absence of a desired "1" is detected at the instant of occurrence, the presence of an undesired "1" will remain undetected until the desired "1" is at one of the monitors and the undesired "1" is at the other monitor. Accordingly, the maximum number of shifting pulse intervals $I_s$ during which the undesired "1" can remain undetected is given by:

$$I_s = \frac{N-(2)^x}{2} \qquad (1)$$

where N is the number of stages in the register and $x$ is one or zero, depending upon whether N is even or odd.

Nevertheless, in keeping with the invention, the distributor may be arranged to allow detection of an undesired "1" at its moment of occurrence. Such detection is of importance where even a temporary disturbance in timing must be avoided.

To provide immediate detection of an undesired "1" with a four-stage register, the distributor of FIG. 1 is supplemented by a second EXCLUSIVE-OR detector 50–2 and its accompanying monitors 40–3 and 40–4, as depicted in FIG. 2. In general, the number of detectors D is given by:

$$D = \frac{N+y}{2} \qquad (2)$$

where N is the number of stages in the register and $y$ is one or zero, depending upon whether N is odd or even. The outputs of the detectors are applied to a setting gate 60 through an AND gate 80 of conventional variety. As before, the stages are divided into two units per detector 50. However, the units for the respective detectors 50–1 and 50–2 are staggered. Thus, the first unit for the first detector includes the first and second stages 10–1 and 10–2, while the comparable unit for the second detector includes the second and third stages 10–2 and 10–3.

The distributor of FIG. 2 is also provided with a pair of reset switches 81. Depending upon whether the switches 81 are positioned in their "automatic" or "framing" positions $o$ or $f$, the setting signal either effectuates an immediate restoration of the prescribed permutation of signal states among the stages, or it awaits the occurrence of a framing signal derived by frequency division from the pulse source 30.

Assume that the various stages 10 in FIG. 2 are so set with respect to their first terminals 20 that a "1" appears in the first stage 10–1 and a "0" appears in all the remaining stages 10–2 through 10–4. Then a complementary "1" and complementary "0's" are applied to the various AND-NOT gates 40. Because of the dual connection of the second terminal 21–1 of the first stage 10–1, both the first and fourth AND-NOT gates 40–1 and 40–4 have individual terminals that carry "0's." All other terminals of the gates carry "1's." Consequently, the inputs to the EXCLUSIVE-OR detectors 50–1 and 50–2 are alternately a "1" and a "0," so that both of their outputs are "1's." As a result, the output of the ordinary AND gate 80, linking the detectors 50 with the setting gate 60 is also a "1" and, for the reasons discussed in conjunction with FIG. 1, the setting gate 60 has no effect upon the signal levels of the various stages.

However, should a spurious "1" appear in, for example, the second stage 10–2, a "0" is applied to both the first and third AND-NOT gates 40–1 and 40–3. Only the output of the third such gate is changed. It becomes a "1" with the result that the second EXCLUSIVE-OR gate 50–2 produces a "0" at the AND gate 80.

If the reset switches 81 are in their "framing" positions $f$, all stages are then set to "0" with respect to their first terminals 20. Thereafter, on the occurrence of a framing signal obtained by frequency division from the pulse source 30, a "1" enters the first stage 10–1 and the continuous circulation of the prescribed signal state recommences. Of course, should it be desirable to recommence the timing sequence without waiting for the framing signal, the reset switches 81 are connected to their "automatic" positions $o$.

Numerous monitor and detector networks, along with their employment in conjunction with many varieties of closed-loop and open-loop shift registers will occur to those skilled in the art. In addition, various adaptations of the distributor, taken with means for preventing premature detection and for applying framing signals, will also be apparent.

What is claimed is:

1. Apparatus which comprises a plurality of tandem-connected shift-register stages, each capable of adopting diverse signal states, said stages being variously set with a prescribed permutation of said signal states, means for shifting said prescribed permutation with respect to said stages, monitoring means for monitoring the states of said stages, means responsive to said monitoring means for detecting any non-prescribed permutation of said signal states existing in said stages, and means activated by said detecting means for setting said stages with said prescribed permutation.

2. Apparatus which comprises a plurality of tandem-connected shift-register stages, each capable of adopting first and second signal states, the various stages being set with a prescribed permutation of said first and second signal states, a source of shifting signals, means for shifting said prescribed permutation by one stage for each occurrence of a shifting signal from said source, gating means for individually monitoring the states of said various stages, detecting means responsive to said gating means for detecting any non-prescribed permutation of the signal states existing in said various stages, and means activated by said detecting means and responsive to the detection of each non-prescribed permutation for setting said various stages with said prescribed permutation.

3. In combination with apparatus for transferring the signal state stored by each preceding stage of a shift register to each succeeding stage of the shift register for each occurrence of a shifting pulse signal and setting means for setting the stages with various signal states according to a prescribed asymmetric code pattern, error correcting means which comprises means for comparing first and second portions of said code pattern, and means for detecting all symmetry conditions of the compared portions of said code pattern to cause said setting means to set said stages with signal states according to said prescribed code pattern, thereby to detect and correct each error condition in the operation of said apparatus.

4. Apparatus for sequentially distributing an error-corrected timing signal on successive output terminals, which comprises a plurality of tandem connected shift register stages that are individually coupled to respective ones of the output terminals, setting means for setting, with respect to said output terminals, one of said stages with a first signal state and each remaining stage with a second signal state, means for advancing said first signal state on a stage by stage basis, means for collectively monitoring a first group of said stages to produce a first monitor signal, means for collectively monitoring a second group of said stages to produce a second monitor signal ,and means for producing an error signal when, and only when, the monitor signals are alike, thereby to detect an error condition, and means for activating said setting means for said error condition, thereby to eliminate said error condition.

5. Apparatus which comprises a plurality of tandem-connected shift-register stages, each capable of adopting first and second signal states, said stages being set with a prescribed permutation of said first and second signal states, a source of shifting signals, means for shifting said prescribed permutation by one stage for each occurrence of a shifting signal from said soure, AND-NOT gating means for collating the signal states of distinctive units of said stages, detecting means responsive to said AND-NOT gating means for detecting any nonprescribed permutation of the signal states existing in said stages, and means activated by said detecting means and responsive to the detection of each nonprescribed permutation for setting said stages with said prescribed permutation.

6. Apparatus which comprises a plurality of tandem-connected shift-register stages, each capable of adopting first and second signal states, said stages being set with a prescribed permutation of said first and second signal states, a source of shifting signals, means for shifting said prescribed permutation by one stage for each occurrence of a shifting signal from said source, collating means for collating the signal states of distinctive units of said stages, EXCLUSIVE-OR network means responsive to said collating means for detecting any nonprescribed permutation of the signal states existing in said various stages, and means activated by said EXCLUSIVE-OR means and responsive to the detection of each nonprescribed permutation for setting said various stages with said prescribed permutation.

7. Apparatus which comprises a plurality of tandem-connected shift-register stages, each capable of adopting first and second signal states, the various stages being set with a prescribed permutation of said first and second signal states, a source of shifting signals, means for shifting said prescribed permutation by one stage for each occurrence of a shifting signal from said source, gating means for individually monitoring the states of said various stages, detecting means responsive to said gating means for detecting any nonprescribed permutation of the signal states existing in said various stages, setting means activated by said detecting means and responsive to the detection of each nonprescribed permutation for setting said various stages with said prescribed permutation, and means for inhibiting said source from prematurely activating said setting means.

8. Apparatus which comprises a plurality of tandem-connected shift-register stages, each capable of adopting first and second signal states, the various stages being set with a prescribed permutation of said first and second signal states, a source of shifting signals, means for shifting said prescribed permutation by one stage for each occurrence of a shifting signal from said source, collating means for collating the signal states of distinctive pluralities of said stages, detecting means responsive to said collating means for detecting any nonprescribed permutation of the signal states existing in said various stages, and means activated by said detecting means and responsive to the detection of each nonprescribed permutation for setting said various stages with said prescribed permutation.

9. Apparatus which comprises a plurality of tandem-connected shift-register stages, each capable of adopting first and second signal states, the various stages being set with a prescribed permutation of said first and second signal states, a source of shifting signals, means for shifting said prescribed permutation by one stage for each occurrence of a shifting signal from said source, means for individually monitoring the states of first and second pluralities of said various stages, means responsive to the monitoring means for detecting any nonprescribed permutation of the signal states existing in each plurality of said various stages, and means activated by the detecting means and responsive to the detection of each nonprescribed permutation for setting said various stages with said prescribed permutation.

References Cited by the Examiner

UNITED STATES PATENTS

| | | | |
|---|---|---|---|
| 2,931,922 | 4/60 | Tubinis | 307—88.5 |
| 2,956,180 | 10/60 | James | 307—88.5 |
| 3,051,855 | 8/62 | Lee | 328—48 X |

ARTHUR GAUSS, *Primary Examiner.*

HERMAN KARL SAALBACH, GEORGE N, WESTBY, *Examiners.*